United States Patent
Midgley

(10) Patent No.: US 11,226,837 B2
(45) Date of Patent: Jan. 18, 2022

(54) ON-DEMAND APPLICATIONS

(71) Applicant: CITRIX SYSTEMS, INC., Fort Lauderdale, FL (US)

(72) Inventor: Christopher W. Midgley, Northborough, MA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 132 days.

(21) Appl. No.: 16/441,417

(22) Filed: Jun. 14, 2019

(65) Prior Publication Data

US 2020/0394056 A1 Dec. 17, 2020

(51) Int. Cl.
*G06F 9/455* (2018.01)
*G06F 9/451* (2018.01)

(52) U.S. Cl.
CPC .......... *G06F 9/452* (2018.02); *G06F 9/45558* (2013.01); *G06F 2009/45595* (2013.01)

(58) Field of Classification Search
CPC .................. G06F 9/452; G06F 9/45558; G06F 2009/45595
See application file for complete search history.

(56) References Cited

U.S. PATENT DOCUMENTS

| | | | |
|---|---|---|---|
| 9,292,323 B2* | 3/2016 | Suresh | G06F 9/45533 |
| 2006/0036570 A1 | 2/2006 | Schaefer et al. | |
| 2014/0095574 A1* | 4/2014 | Zhou | H04L 67/10 709/201 |
| 2016/0112497 A1* | 4/2016 | Koushik | G06F 8/61 726/7 |
| 2017/0126528 A1* | 5/2017 | Padmanabhan | G06F 9/00 |
| 2018/0113705 A1 | 4/2018 | Webb et al. | |
| 2018/0114002 A1* | 4/2018 | Webb | G06F 21/31 |

\* cited by examiner

*Primary Examiner* — Wissam Rashid
(74) *Attorney, Agent, or Firm* — Allen, Dyer, Doppelt + Gilchrist, PA

(57) ABSTRACT

A virtual server includes at least one processor to create a single composited layered image comprising an operating system layer and an application shortcut that includes a representation of an application while not including the application. The single composited layered image is provided as a virtual session to a client computing device. An application layer is mounted to the single composited layered image in response to a user of the client computing device interacting with the application shortcut, with the application layer including the application.

20 Claims, 7 Drawing Sheets

ON-DEMAND APPLICATIONS

TECHNICAL FIELD

The present disclosure relates to desktop virtualization, and more particularly, to deploying applications as they are used.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users.

In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

Managing custom images for a wide range of users and use cases is expensive and complex. Typically, organizations build a smaller number of images to reduce management and testing complexity, at the cost of over-installing applications (on those images) beyond the needs of any one user. This increases overall cost because the software must be licensed for all users that consume the image, even if they do not use the software. This also increases complexity and cost when an application needs to be updated for all users since more testing and downtime are required for deploying a large number of desktops.

SUMMARY

A virtual server includes at least one processor configured to create a single composited layered image comprising an operating system layer and an application shortcut that includes a representation of an application while not including the application, and provide the single composited layered image as a virtual session to a client computing device. The at least one processor may mount an application layer to the single composited layered image in response to a user of the client computing device interacting with the application shortcut, with the application layer including the application.

The application shortcut may include an application shortcut layer. The virtual session may include at least one of a virtual application and a virtual desktop.

The application shortcut may advantageously allow an application to deploy on-demand, as it is used, rather than built into images and/or deployed independent of usage. With the application shortcut, the user experiences what appears to be an installed, fully functional application. Instead, the user does not receive the application until the user attempts to use it which then causes the application to be instantly delivered to the user. When the application is a licensed application, no licensing costs are incurred when the shortcut application is deployed and unused since no application software is actually included as part of the application shortcut.

Mounting the application layer to the single composited layered image may seamlessly make the application available to the user.

The application shortcut may transfer control to the application in response to the user interacting with the application shortcut.

The user may interact with the application shortcut, for example, by requesting the application to be launched, with the request being intercepted by the application shortcut causing the at least one processor to mount the application layer so that the application is available to the user.

The user may interact with the application shortcut, for example, by requesting a file mapped to the application to be opened, with the request being intercepted by the application shortcut causing the at least one processor to mount the application layer so that the application is available to the user.

The application shortcut may include an icon and textual information representing the application.

The application shortcut may include a programs menu, file extension mapping and component object model (COM) objects representing the application.

The at least one processor may be further configured to apply a lease schedule to the application, with the lease schedule defining an amount of time the at least one processor is to create the single composited layered image to include the application layer a next time the user logs into the virtual server. After the lease schedule ends, the at least one processor may be further configured to revert to the application shortcut the next time the user logs into the virtual server.

The at least one processor may be further configured to provide the single composited layered image as a virtual session to a plurality of client computing devices, with the lease schedule limiting a total number of users of the application.

The at least one processor may be further configured to report on usage of the application each time the user logs into the virtual server. The at least one processor may be further configured to revert to the application shortcut a next time the user logs into the virtual server if the application is not being used by the user.

The at least one processor may be further configured, in response to the user interacting with the application shortcut, to compare a location of the client computing device to an application geo-location database before mounting the application layer to the single composited layered image, with the application geo-location database defining where the application can be accessed.

Another aspect is directed to a method for operating a virtual server comprising creating a single composited layered image comprising an operating system layer and an application shortcut that includes a representation of an application while not including the application, and providing the single composited layered image as a virtual session to a client computing device. An application layer is mounted to the single composited layered image in response to a user of the client computing device interacting with the application shortcut, with the application layer including the application.

Yet another aspect is directed to a non-transitory computer readable medium for operating a virtual server, and with the non-transitory computer readable medium having a plurality of computer executable instructions for causing the virtual server to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed below, a virtual server is configured to provide a single composited layered image with an application shortcut. The single composited layered image is provided as part of a virtual session to a client computing device. The application shortcut is a representation of an application, which may be a licensed application. Licensing costs are not incurred until a user interacts with the application shortcut, which then causes the actual application to be available to the user.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including network-attached storage and cloud-connected storage, as well as hard disks, CD-ROMs, optical storage devices, magnetic storage devices, and/or any combination thereof.

Figure 1:
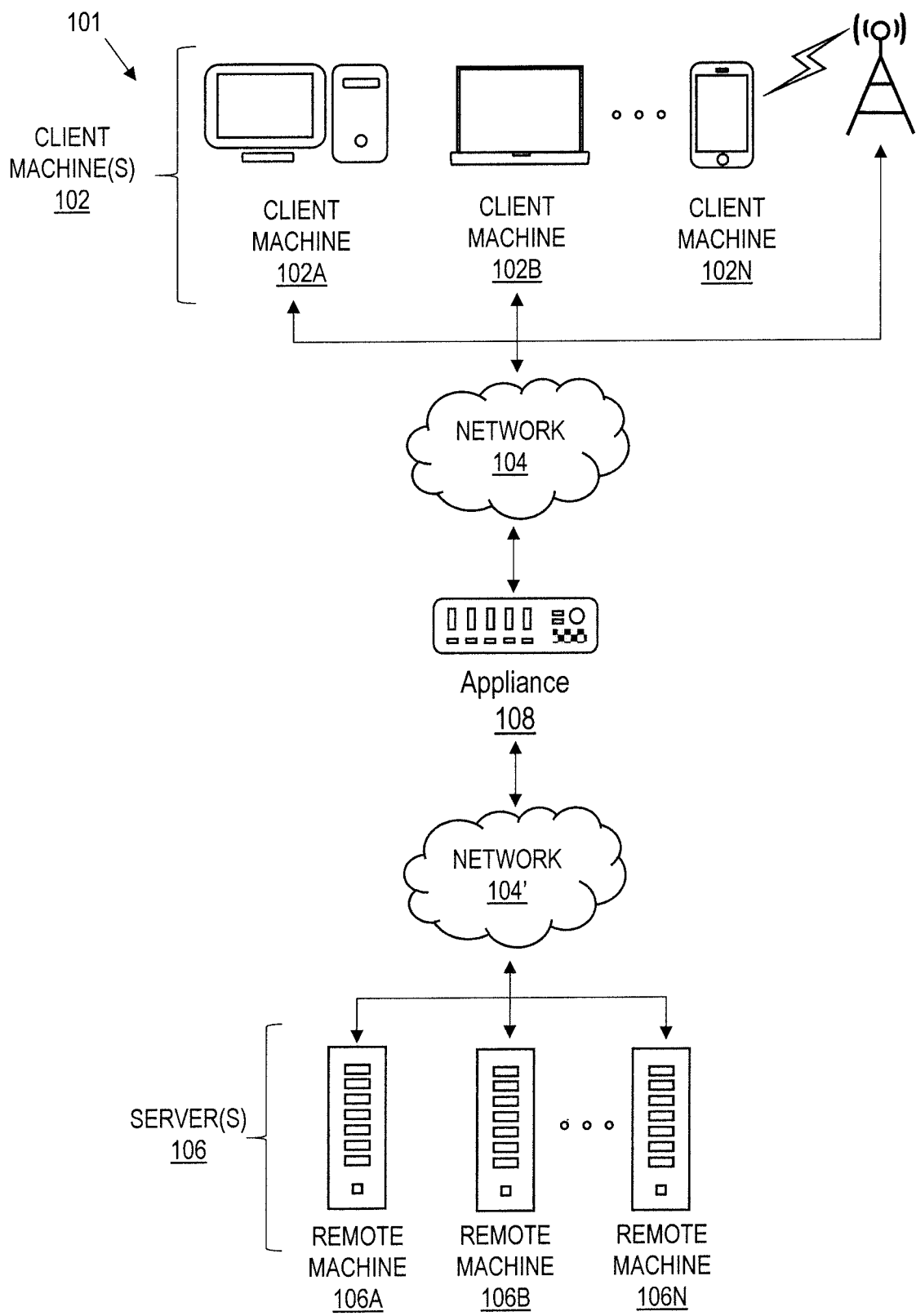
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
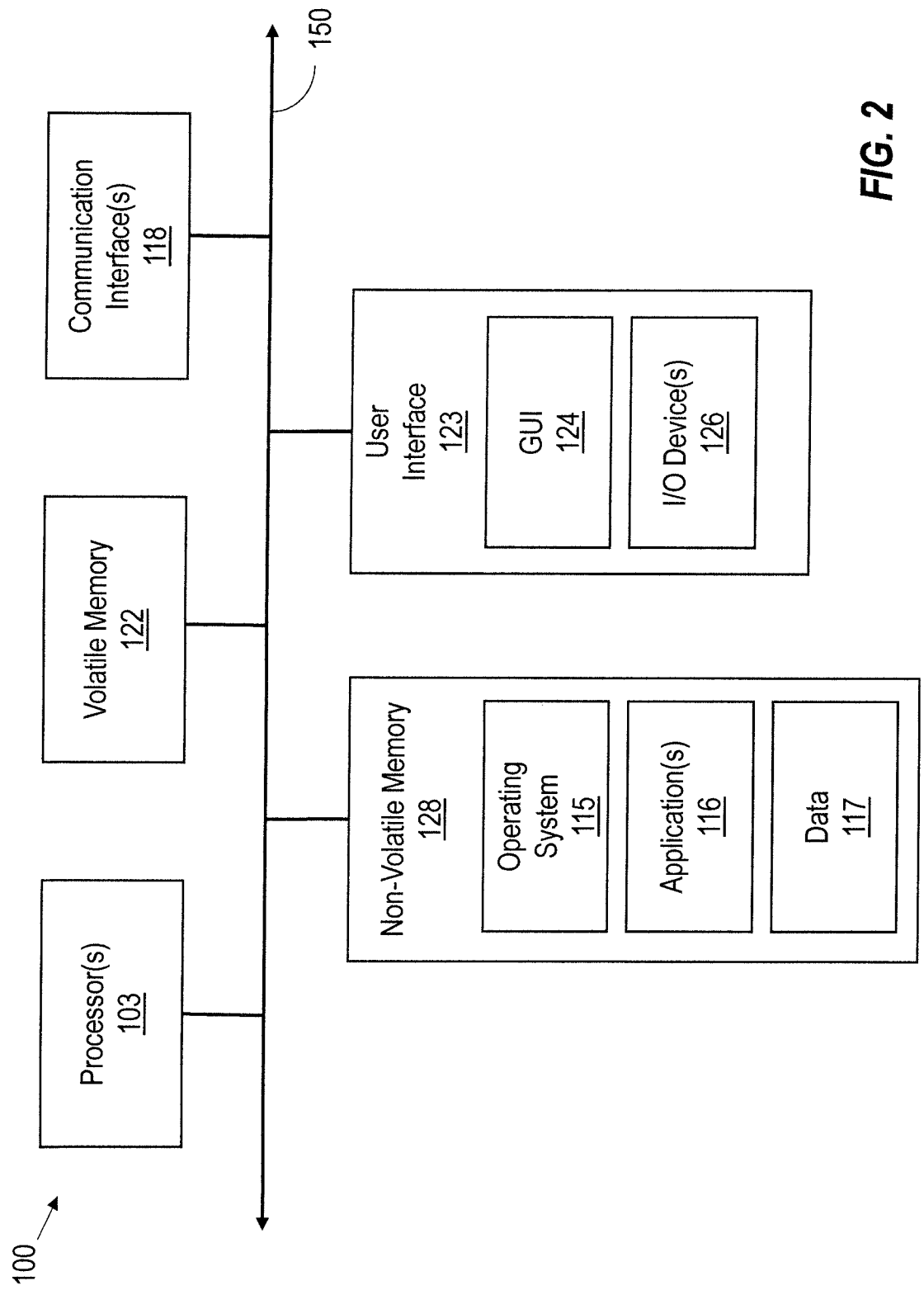
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals. The processor(s) 103 may be centralized or distributed, such as in a cloud-based environment.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

As will be discussed below, a virtual server is configured to provide a single composited layered image to a client computing device as a virtual session, with the single composited layered image including an application shortcut. The application shortcut may be delivered to the single composited layered image using elastic layering. Elastic layering extends layering by allowing layers to be attached to user sessions (such as by session ID and user ID) on-demand. The application shortcut may also be provided via software built into the composited layer.

The application shortcut allows a user of the client computing device to experience what appears to be an installed, fully functional application. When the user selects the application shortcut, then the actual application is made available to the user. This allows the application to be deployed on-demand rather than deployed independent of usage, which reduces licensing costs. As such, the systems and methods set forth herein advantageously provide improved performance within a virtualized and/or enterprise computing environment.

Layering is a technology that separates computer applications from an operating system image, and allows the applications to be added and removed from the operating system by merging the file systems instantly, without application installation or removal on the operating system image. This allows centralized storage and IT management of applications, with increasing benefits when scaling up company users.

A virtualized view of the file system and registry is presented in layering. Layering software intercept various I/O requests to the various underlying file systems (such as on Windows, the NTFS file system and Windows registry) and returns modified data so that end users experience unified file systems that merge or composite the data that come from multiple sources (or layers).

Managing custom images for a wide range of users and use cases is expensive and complex. Typically, organizations build a smaller number of images to reduce management and testing complexity, at the cost of over-installing applications (on those images) beyond the needs of any one user. This increases overall cost because the software must be licensed for all users that consume the image, even if they do not use the software.

Elastic layering extends layering by allowing layers to be attached to user sessions (such as by session ID and user ID)

on-demand. Consequently, elastic layering can deliver applications based on user identity rather than simply based on assigned image. This helps resolve the problem of over-installing applications (on those images) beyond the needs of any one user because it lets policy determine which applications should be made available to a user, rather than building a unique image per-use case. However, this method also leads to over-subscription to applications (and therefore, increased licensing costs) because it is difficult to impossible for an IT organization to know which users need/use which applications.

Figure 3:
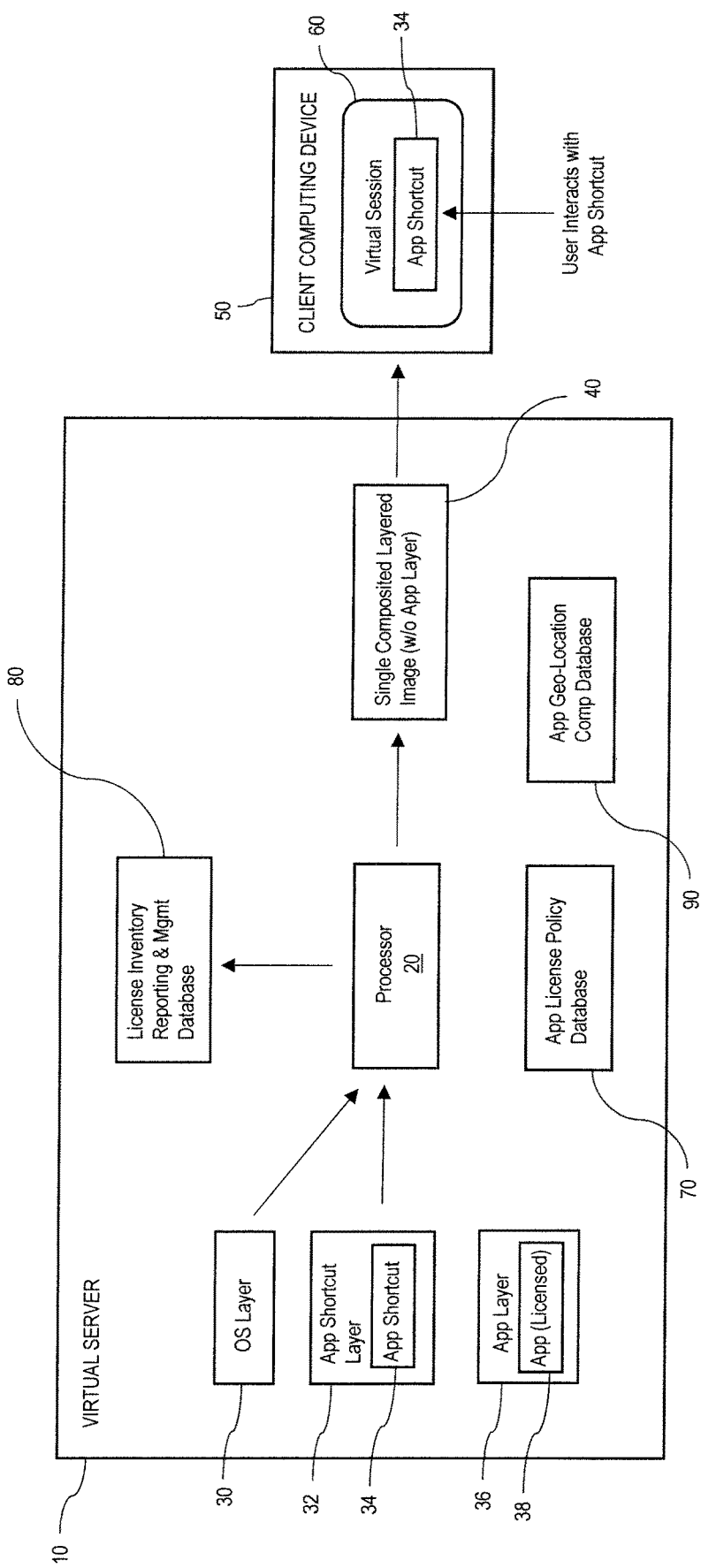
FIG. 3 is a block diagram of a virtual server providing a single composited layered image that includes an application shortcut in which various aspects of the disclosure may be implemented.

Referring now to FIG. 3, the illustrated virtual server 10 provides the ability to deliver applications based on actual usage. Instead of delivering the full application to a user, an "elastic shortcut" is delivered instead. The elastic shortcut will also be referred to as an application shortcut 34. Although referenced herein as a virtual server 10, described embodiments may alternatively or additionally operate on one or more client devices, one or more servers (e.g., application servers, network storage, etc.) or a combination thereof.

The virtual server 10 has one or more processors 20, which, in some embodiments, may be implemented as a layering engine 20, providing a single composited layered image 40. The one or more processors 20 will be referred to generally as processor 20.

The single composited layered image 40 includes an operating system layer 30 and an application shortcut 34 that is a representation of an application 38 while not including the application 38. The application shortcut 34 may be part of an application layer 32, as illustrated. In other embodiments, the application shortcut 34 is not included in the application layer 32. Instead, the application shortcut 34 may be deployed at login (for users) or boot (for entire systems) via layering software based on policy configurations.

The application 38 being represented by the application shortcut 34 is typically a licensed application that requires a licensing cost to be incurred for its use. Since no software from the application 38 is on the application shortcut layer 32, no licensing cost are incurred.

The single composited layered image 40 is to be provided to a client computing device 50 as a virtual session 60. The virtual session 60 may be a virtual application or a virtual desktop, for example. Although not shown, additional layers may be included in the single composited layered image 40, such as a common application layer for commonly used applications, a platform layer and a user layer. The applications in the common application layer may also be licensed applications, but since they are typically used by a wide range of users there is no need to track their usage. In contrast, the application 38 is typically not an application used by a wide range of end users.

Figure 4:
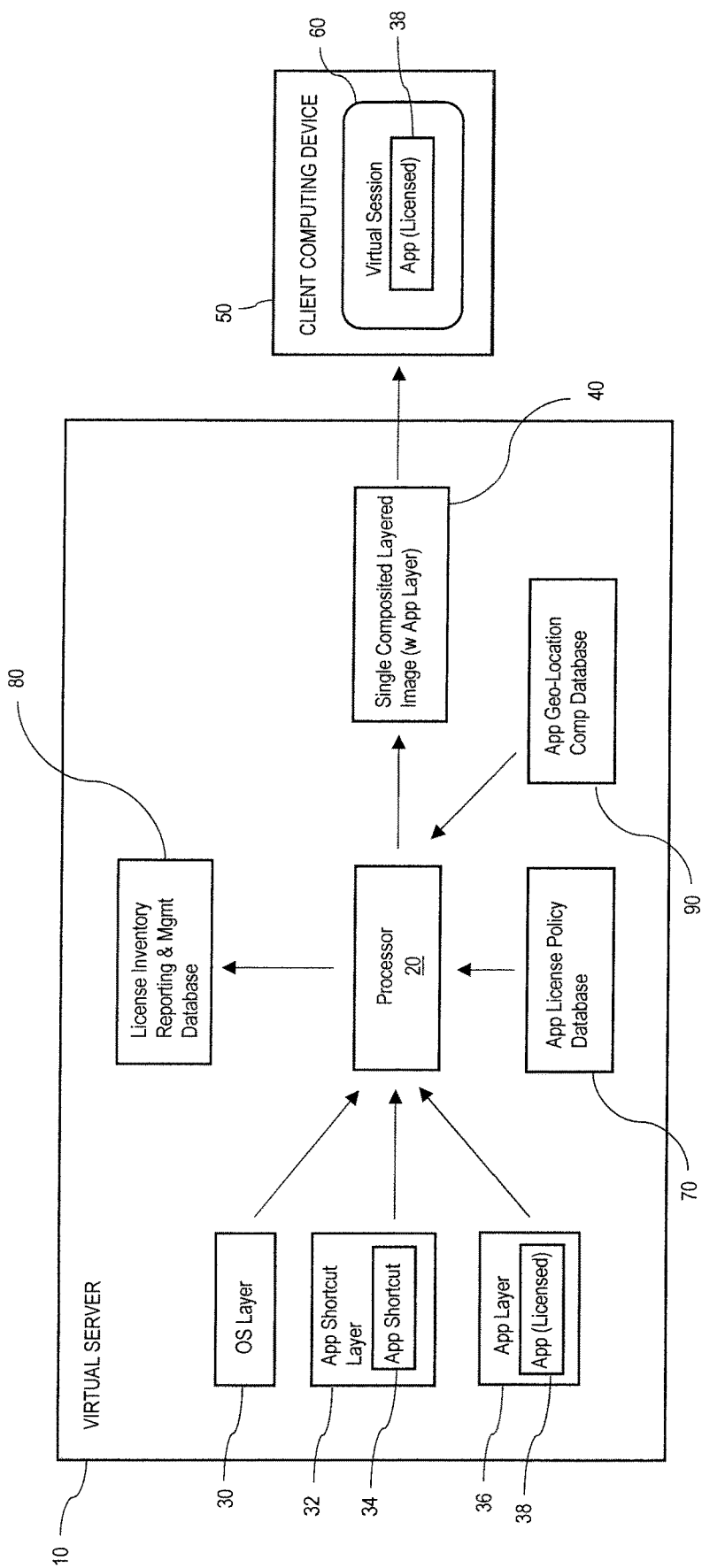
FIG. 4 is a block diagram of the virtual server illustrated in FIG. 3 mounting an application layer to the single composited layered image based on user interaction with the application shortcut.

When a user of the client computing device 50 interacts with the application shortcut 34, as shown in FIG. 3, then the application 38 is made available to the user. Referring now to FIG. 4, an application layer 36 that includes the application 38 is bound or mounted to the single composited layered image 40 in response to the user interacting with the application shortcut 34 as illustrated in FIG. 3. Once the application 38 has been provided to the user's virtual session 60, then a licensing cost is to be incurred.

As noted above, the application shortcut 34 is not the original application 38, but instead is a representation of the application 38. The application shortcut 34 appears like the true application, is available to the user as it would be expected (such as via the Programs menu, via file extensions mappings, as COM objects, etc.), but none of the original software is actually included as part of the application shortcut 34. Therefore, no licensing costs are incurred when the application shortcut 34 is deployed and unused.

When the user interacts with the application shortcut 34, the application shortcut 34 intercepts the request and causes an elastic Layer (i.e., the application layer 36) to be instantly bound or mounted to the single composited layered image 40 which delivers the application 38 to the user. Mounting the application layer 36 to the single composited layered image 40 seamlessly makes the application 38 available to the user. The application shortcut 34 thus transfers control to the application 38, thereby making it a transparent/seamless experience for the user.

The user may interact with the application shortcut 34 in a number of different ways. One way is for the user to interact with the application shortcut 34 by requesting the application 38 to be launched by selecting an icon representing the application 38. Another example of interacting with the application shortcut 34 is based on embedding the application shortcut 34 in another application. This is similar to embedding Excel in a Word document, for example. These requests are intercepted by the application shortcut 34 causing the processor 20 to mount the application layer 36 so that the application 38 is available to the user. Yet another way for the user to interact with the application shortcut 34 is by requesting a file mapped to the application 38 to be opened, with the request being intercepted by the application shortcut 34 causing the processor 20 to mount the application layer 36 so that the application 38 is available to the user. These techniques to detect the need to mount the application layer 36 are examples, and are not to be limiting.

The application shortcut 34 includes the above referenced icon and textual information representing the application 38. The application shortcut 34 also includes a programs menu, file extension mapping, and component object model (COM) objects, for example, representing the application 38. As discussed above, user interaction with the application shortcut 34 launches the application 38 in response to the user selecting the icon or by opening a file that is mapped to the application 38.

The application shortcut 34 is not limited to a single object. As noted above, the application shortcut 34 may be a collection of items that represent how an application integrates into an operating system, such as being able to embed the application shortcut 34 into another application, or file associations in a file browser, such as Windows Explorer.

To further improve compatibility, a "lease" can be applied to the application 38 such that once the application 38 is used, the full application 38 is automatically delivered to the virtual session 60 every time the user logs in (i.e., (elastic layering). Once the application 38 is no longer in use for a "lease schedule" amount of time, the next time the user logs in, the application reverts to an application shortcut 34.

The lease schedule may be included in an application license policy database 70, which provides lease schedule information to the processor 20. The processor 20 is configured to apply the lease schedule to the application 38, with the lease schedule defining an amount of time the processor 20 is to create the single composited layered image 40 to include the application layer 36 a next time the user logs into the virtual server 10. After the lease schedule ends, the processor 20 is further configured to revert to the application shortcut 34 the next time the user logs into the virtual server 10.

On the backend, inventory analysis and reporting can be made available by the processor 20 to show which users are consuming which applications. The inventory analysis and reporting is made available to a license inventory reporting and management database 80. This database 80 is beneficial to IT administrators in terms of accurately determining license compliance. The processor 20 reports on usage of the application 38 each time the user logs into the virtual server 10.

Since applications continue to be delivered by application shortcuts 34, any application 38 which is no longer in use would automatically be removed when the user logouts. This removal of the application 38 when no longer used by the user allows for a significant reduction in software licensing costs when applied to a large number of users.

Another capability would be for the application license policy database 70 to limit the total number of users of the application 38. For example, say an expensive software product is licensed on a floating seat basis for a total of 25 users. When 25 individual users have consumed that software via the application shortcut 34 within a working period, when user 26 requests to use the application 38 the user could optionally instead receive a messaging saying that there are no available licenses, and the user should try again later. IT administrators could receive a message, or a report, indicating which applications need more licenses to remain in compliance.

The processor 20 is also fed by an application geo-location compliance database 90. The application geo-location compliance database 90 defines where the application 38 can be accessed. In response to the user interacting with the application shortcut 34, the processor 20 compares a location of the client computing device 50 to the application geo-location database 90 before mounting the application layer 36 to the single composited layered image 40.

For example, authorization to access the application 38 may be based on if the user is operating the client computing device 50 within the confines of an enterprise the user is associated with. As another example, the application 38 may not be accessed in certain countries. The processor 20 compares a current location of the client computing device 50 to locations within the application geo-location compliance database 90 to determine compliance.

The technology behind on-demand applications is two-fold. First, is to analyze applications in a layer to understand what application shortcuts, file associations, COM entries, and other such aspects that "publish" an application into a desktop, along with capturing the appropriate signatures, icons and textual information. Second, publish, based on policy, to desktops upon a user login that embeds the information captured above into the desktop, except to have it trigger an application shortcut service which verifies license compliance, deploys the required application layer, and completes the execution of the initiating request.

Figure 5:
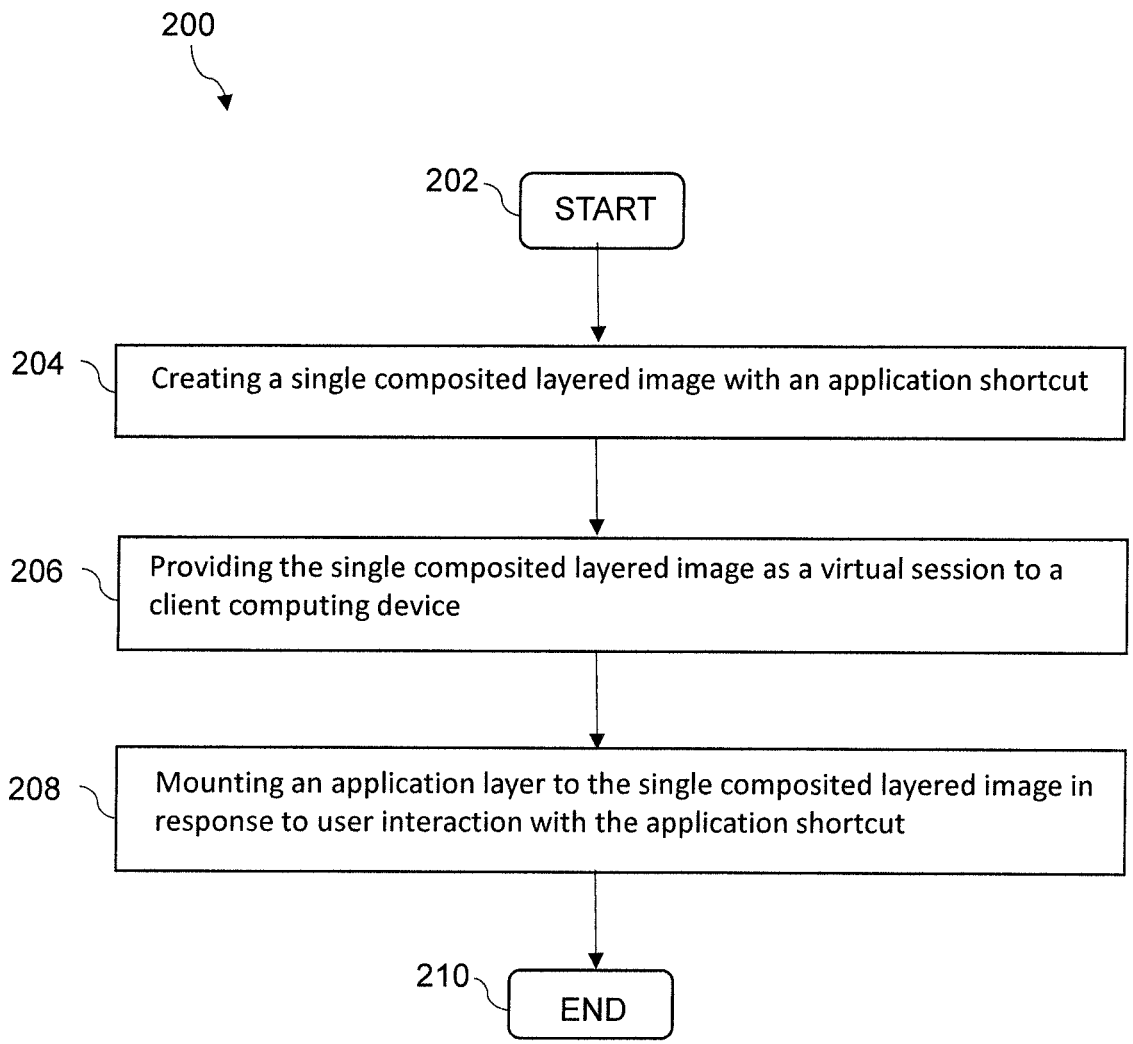
FIG. 5 is a general flowchart illustrating a method for operating the virtual server illustrated in FIG. 3.

Referring now to FIG. 5, a general flowchart 200 illustrating a method for operating the virtual server 10 will be discussed. From the start (Block 202), the method includes creating a single composited layered image 40 with an application shortcut 34 at Block 204. The application shortcut 34 is a representation of an application 38 while not including the application 38. The single composited layered image 40 is provided as a virtual session 60 to a client computing device 50 at Block 206. The application layer 36 is mounted to the single composited layered image 40 in response to a user of the client computing device 50 interacting with the application shortcut 34 at Block 208. The application layer 36 includes the application 38. The method ends at Block 210.

Figure 6:
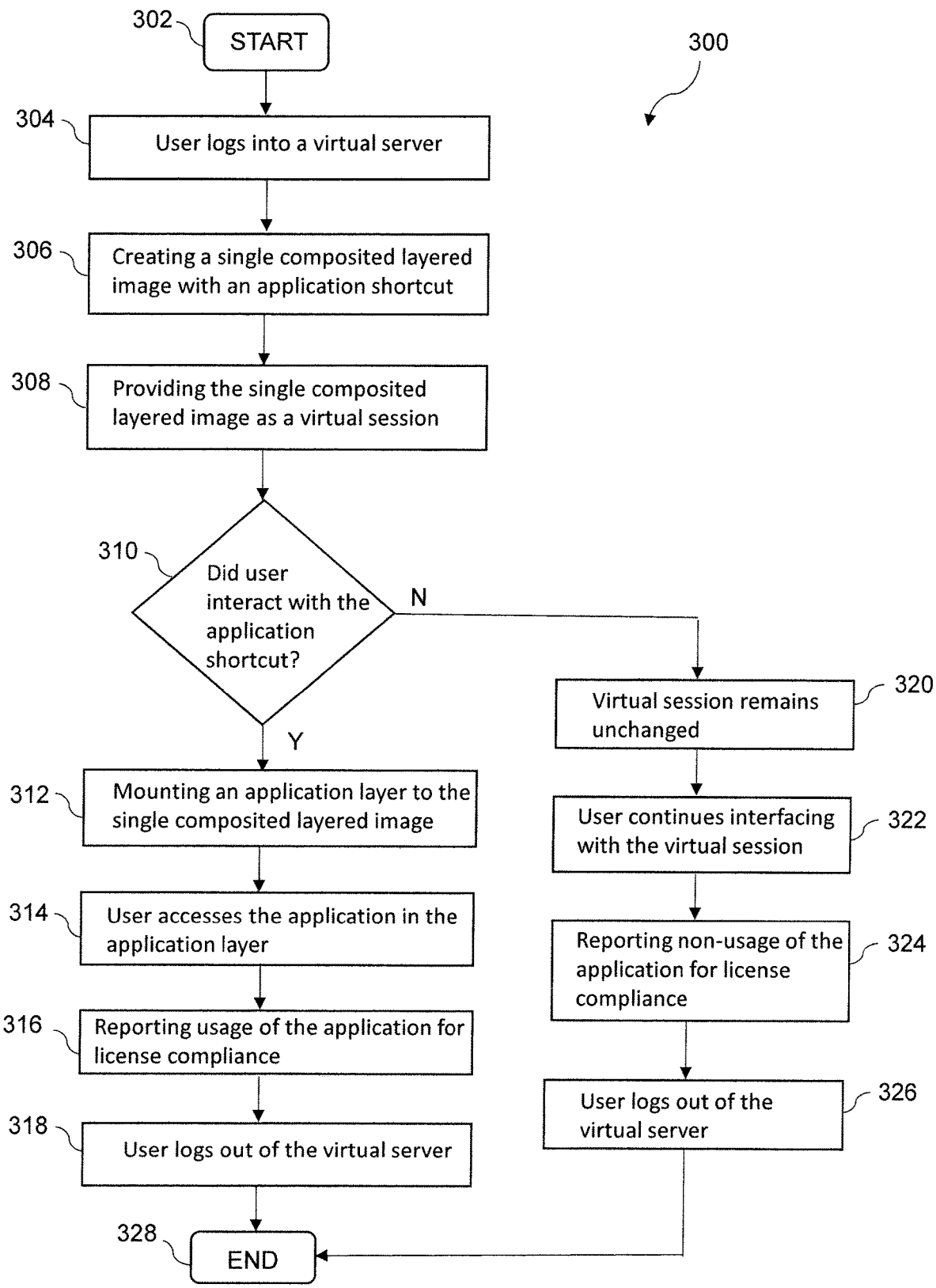
FIG. 6 is a more detailed flowchart illustrating a method for operating the virtual server illustrated in FIG. 3.

Referring now to FIG. 6, a more detailed flowchart 300 illustrating a method for operating the virtual server 10 will be discussed. From the start (Block 302), a user logs into the virtual server 10 via a client computing device 50 at Block 304. In the virtual server 10, a single composited layered image 40 with an application shortcut 34 is created at Block 306. The single composited layered image 40 is provided as a virtual session 60 to the client computing device 50 at Block 308. A determination is made at decision Block 310 on if the user interacts with the application shortcut 34. The interaction may be based on the user launching the application 38 or by opening a file that is mapped to the application 38, for example.

If the user does interact with the application shortcut 34, then the application layer 36 is mounted by the processor 20 to the single composited layered image 40 at Block 312. The user is now able to access the application 38 in the application layer 36 at Block 314. Usage of the application 38 is reported to the license inventory reporting and management database 80 for license compliance at Block 316. The user may then log out of the virtual server 50 at Block 318, and the method ends at Block 328.

If the user does not interact with the application shortcut 34, then the virtual session 60 remains unchanged with the application shortcut 34 at Block 320. The user continues interfacing with the virtual session 60 at Block 322 without interfacing with the application shortcut 34. Non-usage of the application 36 is reported to the license inventory reporting and management database 80 for license compliance at Block 324. The user may then log out of the virtual server 50 at Block 326, and the method ends at Block 328.

Figure 7:
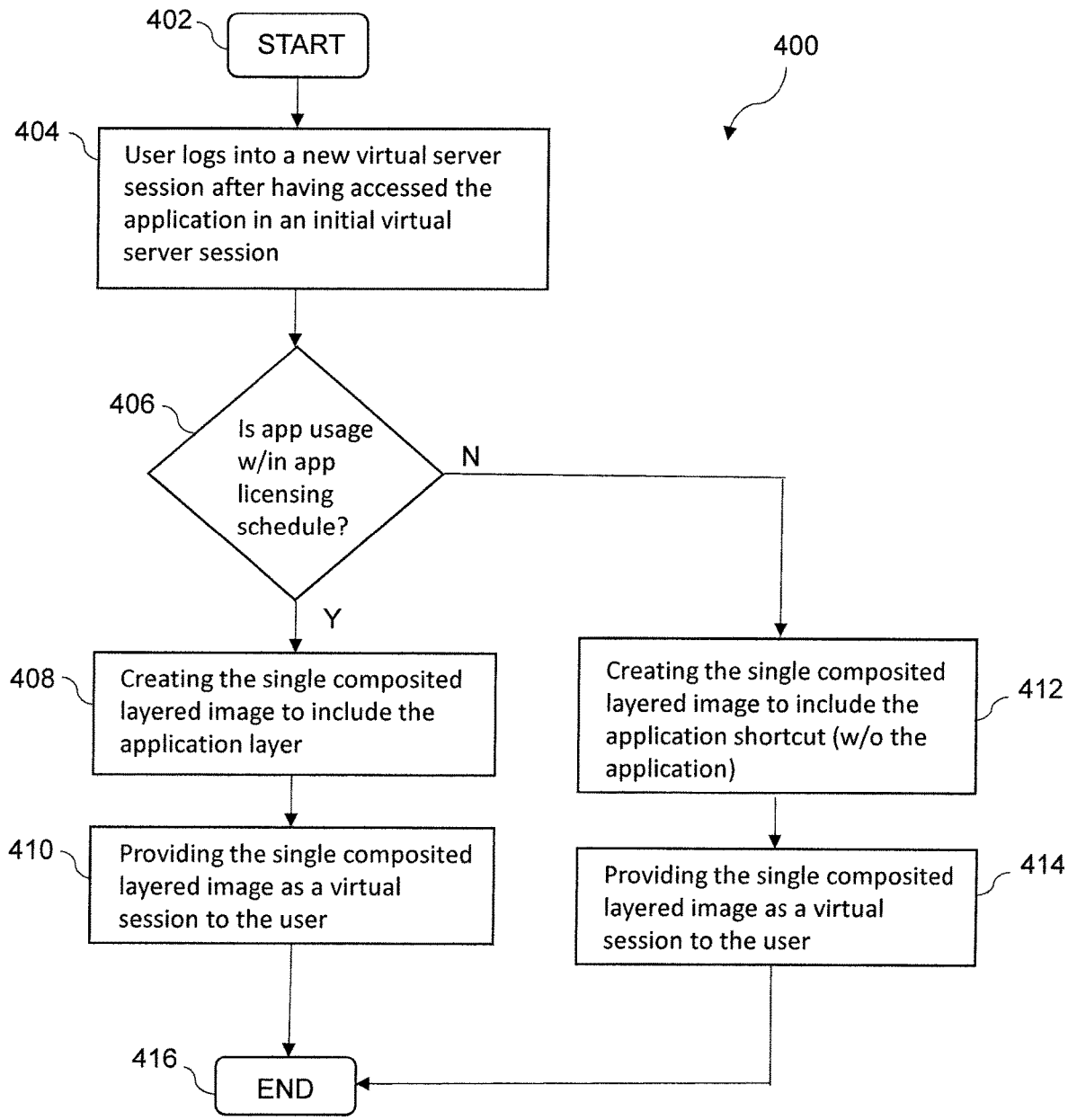
FIG. 7 is a flowchart illustrating a method for operating the virtual server illustrated in FIG. 3 for a new virtual server session based on an application licensing schedule.

Referring now to FIG. 7, a flowchart 400 illustrating a method for operating the virtual server 10 for a new virtual server session 60 based on an application licensing schedule will be discussed. From the start (Block 402), the user logs into the new virtual session 60 after having accessed the application 38 in an initial virtual server session at Block 404. A determination is made at decision Block 406 on if usage of the application 38 is within an application licensing schedule.

The application licensing schedule defines an amount of time the processor 20 is to create the single composited layered image 40 to include the application layer 36 a next time the user logs into the virtual server 10. If usage of the application 38 is within the application licensing schedule, then the single composited layered image 40 is created at Block 408 to include the application layer 36. The single composited layered image 40 is provided as a virtual session 60 to the user at Block 410. The method ends at Block 416.

If usage of the application 38 is not within the application licensing schedule, then the single composited layered image 40 is created at Block 412 without the application layer 36. Here, the single composited layered image 40 includes the application shortcut layer 32. The single composited layered image 40 is provided as a virtual session 60 to the user at Block 414. The method ends at Block 416.

Another aspect is directed to a non-transitory computer readable medium for operating a virtual server 10, and with the non-transitory computer readable medium having a plurality of computer executable instructions for causing the virtual server 10 to perform a series of steps. The steps include creating a single composited layered image 40 comprising an operating system layer 30 and an application shortcut 34 that includes a representation of an application 38 while not including the application 38. The single composited layered image 40 is provided as a virtual session 60 to a client computing device 50. An application layer 36 is mounted to the single composited layered image 40 in response to a user of the client computing device 50 interacting with the application shortcut 34, with the application layer 36 including the application 38.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A virtual server comprising:
at least one processor configured to:
   create a single composited layered image comprising an operating system layer and an application shortcut that includes a representation of an application while not including the application,
   provide the single composited layered image as a virtual session to a client computing device,
   mount an application layer to the single composited layered image in response to a user of the client computing device interacting with the application shortcut, with the application layer including the application, and
   apply a lease schedule to the application, with the lease schedule defining an amount of time said at least one processor is to create the single composited layered image to include the application layer a next time the user logs into the virtual server, and after the lease schedule ends, said at least one processor is further configured to revert to the application shortcut the next time the user logs into the virtual server.

2. The virtual sever according to claim 1 wherein the application shortcut comprises an application shortcut layer.

3. The virtual server according to claim 1 wherein the virtual session comprises at least one of a virtual application and a virtual desktop.

4. The virtual server according to claim 1 wherein mounting the application layer to the single composited layered image makes the application available to the user without requiring the user to further interact with the application shortcut.

5. The virtual server according to claim 1 wherein the application shortcut transfers control to the application in response to the user interacting with the application shortcut.

6. The virtual server according to claim 1 wherein the user interacts with the application shortcut by requesting the application to be launched, with the request being intercepted by the application shortcut causing said at least one processor to mount the application layer so that the application is available to the user.

7. The virtual server according to claim 1 wherein the user interacts with the application shortcut by requesting a file mapped to the application to be opened, with the request being intercepted by the application shortcut causing said at least one processor to mount the application layer so that the application is available to the user.

8. The virtual server according to claim 1 wherein the application shortcut comprises an icon and textual information representing the application.

9. The virtual server according to claim 1 wherein the application shortcut comprises a programs menu, file extension mapping and component object model (COM) objects representing the application.

10. The virtual server according to claim 1 wherein said at least one processor is further configured to provide the single composited layered image as a virtual desktop to a plurality of client computing devices, and wherein the lease schedule limits a total number of users of the application.

11. The virtual server according to claim 1 wherein said at least one processor is further configured to report on usage of the application each time the user logs into the virtual server.

12. The virtual server according to claim 11 wherein said at least one processor is further configured to revert to the application shortcut a next time the user logs into the virtual server if the application is not being used by the user.

13. The virtual server according to claim 1 wherein said at least one processor is further configured, in response to the user interacting with the application shortcut, to compare a location of the client computing device to an application geo-location database before mounting the application layer to the single composited layered image, with the application geo-location database defining where the application can be accessed.

14. A method for operating a virtual server comprising:
creating a single composited layered image comprising an operating system layer and an application shortcut that includes a representation of an application while not including the application;
providing the single composited layered image as a virtual session to a client computing device;
mounting an application layer to the single composited layered image in response to a user of the client computing device interacting with the application shortcut, with the application layer including the application; and
applying a lease schedule to the application, with the lease schedule defining an amount of time the single composited layered image is to be created to include the application layer a next time the user logs into the virtual server, and after the lease schedule ends, the client computing device reverts to the application shortcut the next time the user logs into the virtual server.

15. The method according to claim 14 wherein mounting the application layer to the single composited layered image makes the application available to the user without requiring the user to further interact with the application shortcut.

16. The method according to claim 14 wherein the application shortcut transfers control to the application in response to the user interacting with the application shortcut.

17. The method according to claim 14 wherein the user interacts with the application shortcut by requesting the application to be launched, and further comprising intercepting the request by the application shortcut causing the application layer to be mounted so that the application is available to the user.

18. The method according to claim 14 wherein the user interacts with the application shortcut by requesting a file mapped to the application to be opened, and further comprising intercepting the request by the application shortcut causing the application layer to be mounted so that the application is available to the user.

19. The method according to claim 14 wherein the application shortcut comprises an icon and textual information representing the application.

20. A non-transitory computer readable medium for operating a virtual server, and with the non-transitory computer readable medium having a plurality of computer executable instructions for causing the virtual server to perform steps comprising:
- creating a single composited layered image comprising an operating system layer and an application shortcut that includes a representation of an application while not including the application;
- providing the single composited layered image as a virtual session to a client computing device;
    - mounting an application layer to the single composited layered image in response to a user of the client computing device interacting with the application shortcut, with the application layer including the application; and
- applying a lease schedule to the application, with the lease schedule defining an amount of time the single composited layered image is to be created to include the application layer a next time the user logs into the virtual server, and after the lease schedule ends, the client computing device reverts to the application shortcut the next time the user logs into the virtual server.

* * * * *